July 7, 1964 M. C. HENDRICKSON ET AL 3,140,346

COMMUNICATION RECEIVER

Filed Jan. 30, 1962 2 Sheets-Sheet 1

INVENTORS
Melvin C. Hendrickson
George V. Morris
BY James E. Tracy
ATTORNEY

July 7, 1964 M. C. HENDRICKSON ETAL 3,140,346

COMMUNICATION RECEIVER

Filed Jan. 30, 1962 2 Sheets-Sheet 2

INVENTORS
Melvin C. Hendrickson
George V. Morris
BY James E. Tracy
ATTORNEY

United States Patent Office 3,140,346
Patented July 7, 1964

3,140,346

COMMUNICATION RECEIVER

Melvin C. Hendrickson, Elmhurst, and George V. Morris, Norridge, Ill., assignors to Zenith Radio Corporation, Chicago, Ill., a corporation of Delaware Filed Jan. 30, 1962, Ser. No. 169,791
7 Claims. (Cl. 178—5.1)

Figure 1:
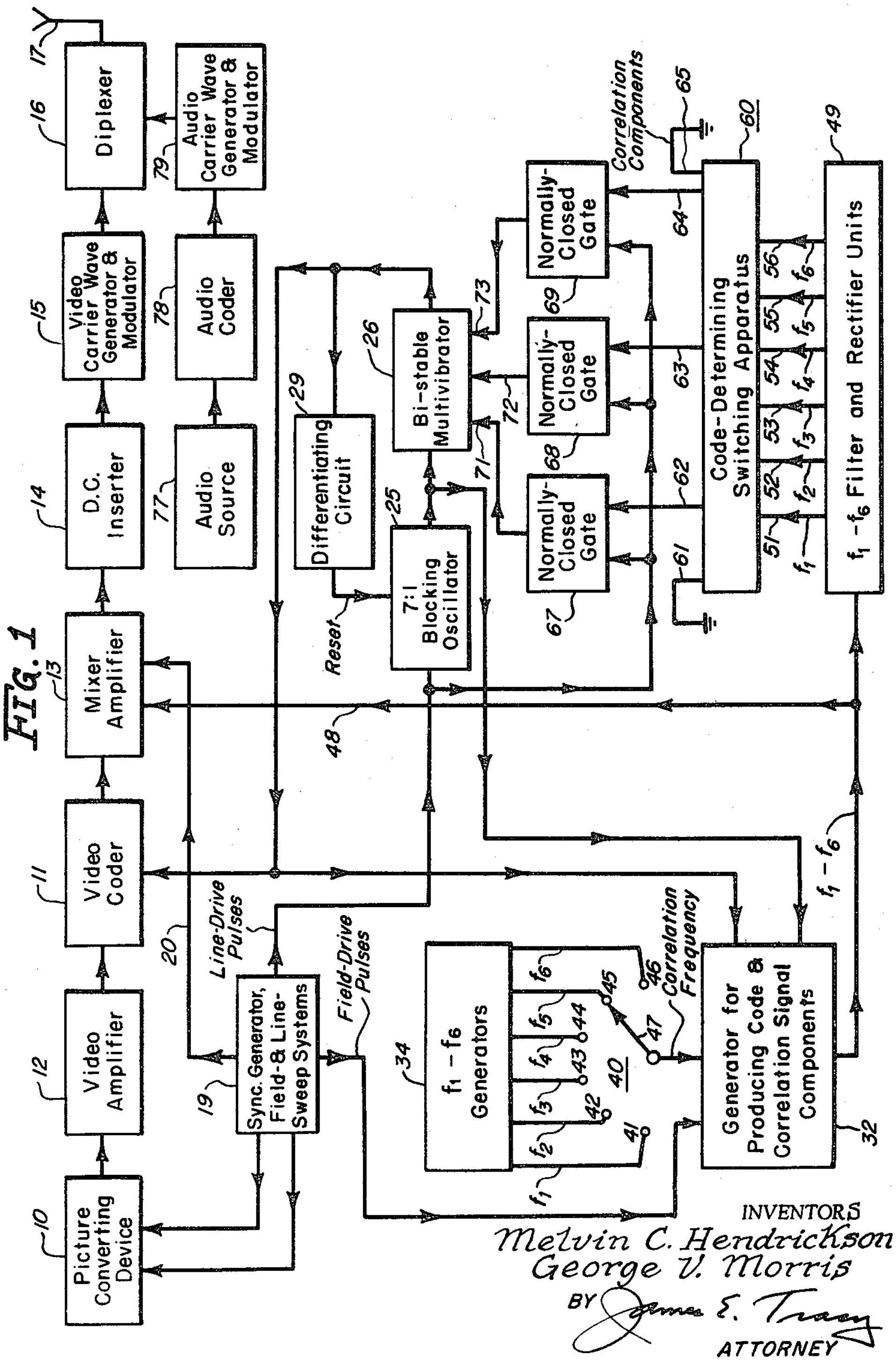

This invention relates to a communication receiver of the type in which code-determining apparatus must be adjusted in accordance with a given adjustment before a received intelligence signal may be intelligibly reproduced, and wherein correlation tests are made to determine if the code-determining apparatus has, in fact, been properly adjusted. The invention is particularly attractive when incorporated in a subscription television receiver for receiving a television signal in coded form, and will be described in such an environment.

Subscriber communication receivers of the above type are disclosed, for example, in copending applications Serial Nos. 26,545, filed May 3, 1960, and issued March 12, 1963 as Patent 3,081,377, in the name of Norman T. Watters; and 26,550, also filed May 3, 1960, and issued March 12, 1963 as Patent 3,081,378, in the name of Melvin C. Hendrickson; and in Patents 2,957,939, issued October 25, 1960, in the name of George V. Morris, and 3,011,016, issued November 28, 1961, in the name of Erwin M. Roschke, all of which are assigned to the present assignee. In the systems disclosed therein the correlation status between a given adjustment or pattern and the instantaneous adjustment of adjustable code-determining apparatus is tested by means of a series of correlation tests to determine if the subscriber has properly adjusted the apparatus; if he has, decoding of the telecast is permitted, but not otherwise. If desired, a recording use mechanism or a charge register is actuated in response to a condition of correct correlation to record the fact that the subscriber has received and decoded a given subscription program. In other words, the charge register records the fact of correlation.

The several advantages and desirable results achieved by employing the correlation testing principle are particularized in the above-mentioned patent disclosures. In copending application Serial No. 169,812 filed concurrently herewith, in the name of George V. Morris, a correlation system is disclosed which requires that all of the correlation tests conducted during a relatively long testing interval must prove correct before an indication of correct correlation manifests. With such an arrangement, the television signal is not intelligibly reproduced until subsequent to the testing interval and then only if all the tests are successful. Moreover, actuation of the charge register is withheld until all of the correlation tests during the testing interval have proved successful. The advantages of requiring correct correlation for a substantial interval before a control function is performed are fully spelled out in the above-mentioned concurrently filed Morris application.

Preferably, the testing interval is tolled by a timing mechanism which progresses from a starting condition to a final condition. If there is a single failure in the correlation tests conducted during the testing interval, it is desirable that the timing mechanism be interrupted and returned to its starting condition. The restoration of most timing mechanisms requires a predetermined restoring time. The present invention is calculated to insure that, in response to a single test failure, the interruption of the timing mechanism endures for an interval at least equal to the restoring time in order for the mechanism to return to its starting condition.

Accordingly, it is an object of the present invention to provide a new communication receiver.

It is another object of the invention to provide an improved communication receiver employing the correlation testing principle.

It is a further object of the invention to insure that a timing mechanism, which tolls a predetermined correlation testing interval, once interrupted remains so for an interval corresponding to its restoring time so that it returns to its starting condition.

A communication receiver for utilizing a received intelligence signal and constructed in accordance with one aspect of the invention comprises an adjustable code-determining apparatus to be established in a predetermined condition of adjustment to effect utilization of the intelligence signal. There are testing means for performing a series of correlation tests to derive, in each of the tests, a control effect if the instantaneous condition of the apparatus corresponds to the predetermined condition of adjustment. A timing mechanism tolls a predetermined time interval and includes a reset device for restoring the mechanism to zero time register. The timing mechanism requires a predetermined restoring time to effect such restoration. Means, responsive to the failure of a correlation test during the predetermined time interval, interrupts the timing mechanism for an interval corresponding to the predetermined restoring time.

Figure 2:
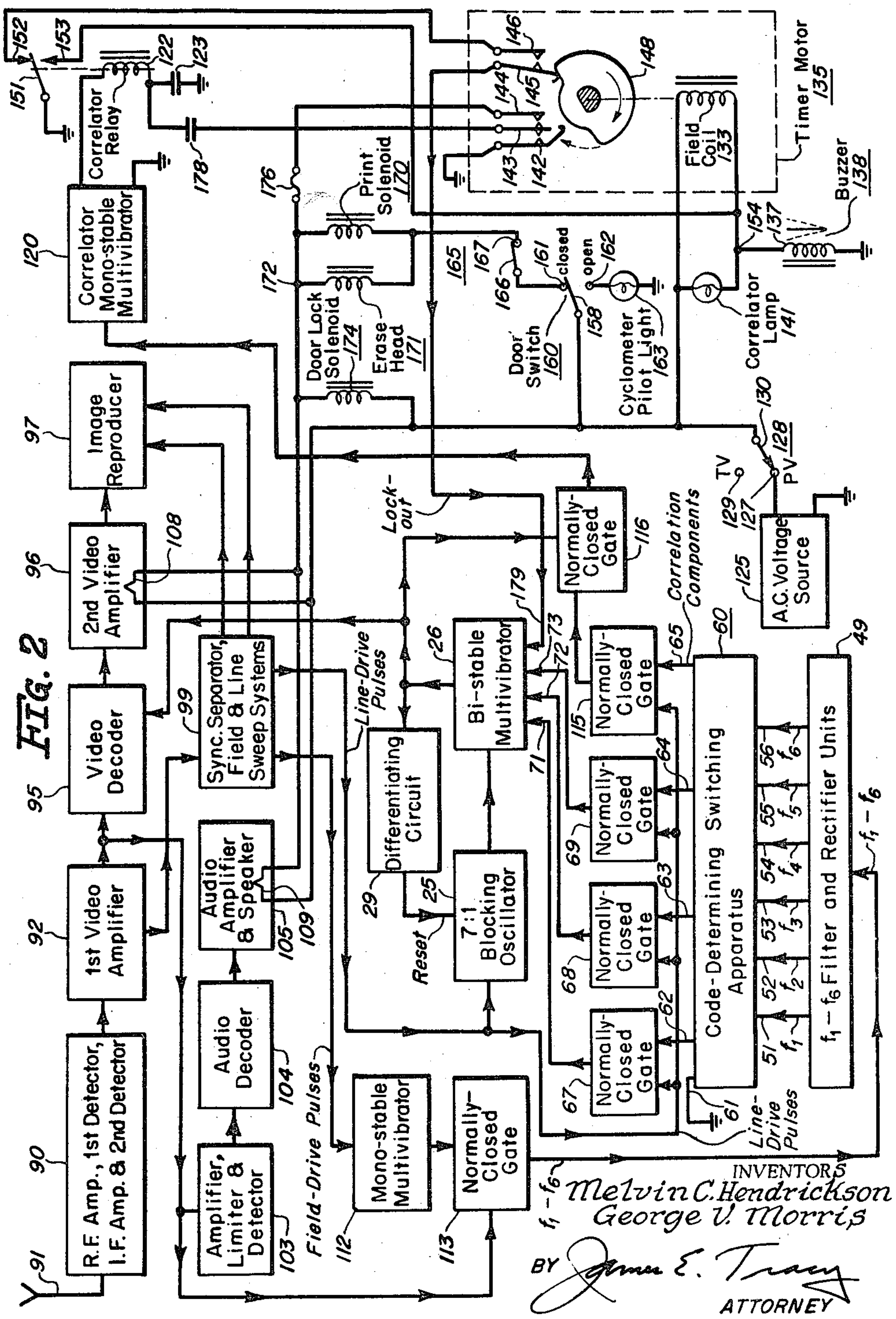

The features of this invention which are believed to be new are set forth with particularity in the appended claims. The invention, together with further objects and advantages thereof, may best be understood, however, by reference to the following description in conjunction with the accompanying drawings in which:

FIGURE 1 is a block diagram of a communication transmitter, specifically a subscription television transmitter; and FIGURE 2 schematically illustrates a communication receiver, specifically a subscription television receiver, constructed in accordance with one embodiment of the invention and arranged to utilize the signal transmitted from the transmitter of FIGURE 1.

Before turning to a description of FIGURE 1, it should be understood that many of the circuits shown therein, and also in FIGURE 2, in block diagram form are illustrated and described in greater detail in the aforementioned copending application Serial No. 26,545, Watters, and in several other patent applications and patents referred to in the Watters case. The expedient of block diagram illustration has been employed in the interest of simplification and in order to pinpoint clearly the invention.

Considering now the structure of the transmitter of FIGURE 1, a picture converting device 10 is provided which may take the form of a conventional camera tube for developing a video signal representing an image to be televised. A video coding device 11 is connected to the output terminals of camera tube 10 through a video amplifier 12. Coder 11 includes a beam-deflection switch tube having a pair of target anodes to one of which is coupled a delay line. In response to a control signal applied to its deflection electrodes, the switch tube selectively interposes the delay line in the video channel as the electron beam in the tube is deflected from one to the other of the two anodes, thereby to change the time relation of video to synchronizing information and to establish two different operating modes. Intermittently varying the relative timing of the video and synchronizing signals effectively codes the television signal since ordinary television receivers, not containing suitable decoding apparatus, require a television signal having a constant time relation of video and synchronizing components; if such is not the case, intelligible image reproduction is impossible.

The output of coder 11 is coupled to one pair of input terminals of a mixer amplifier 13, which in turn is connected through a direct current inserter 14 to a video carrier wave generator and modulator 15 having output terminals connected through a diplexer 16 to a transmitting antenna 17. A synchronizing signal generator supplies field- and line-drive pulses to a field-sweep system and to a line-sweep system, respectively. For convenience, the synchronizing signal generator, and field- and line-sweep systems have been shown by a single block designated by the numeral 19. The output terminals of the sweep systems are connected to the field- and line-deflection elements (not shown) associated with picture converting device 10. The synchronizing signal generator of unit 19 supplies the usual field- and line-synchronizing components and associated pedestal components to mixer amplifier 13 over suitable circuit connections, here schematically illustrated as a single conductor 20.

The synchronizing signal generator additionally supplies line-drive pulses to one input of a conventional 7:1 step-down blocking oscillator 25 which has its output terminals connected to the input circuit of a multi-condition control mechanism in the form of a bi-stable multivibrator 26. Specifically, the output of blocking oscillator 25 is connected to the "common" or "counting" input circuit of bi-stable multivibrator 26. The multivibrator may be of conventional construction, including the usual pair of cross-coupled triodes or transistors rendered conductive in alternation as the multivibrator is triggered between its two stable operating conditions. Blocking oscillator 25 is coupled to both of the triodes or transistors, whichever the case may be, by way of the common or counting input so that the multivibrator is always triggered from its instantaneous condition, whatever one that may be, to its opposite condition in response to successive pulses applied from the oscillator. The output terminals of multivibrator 26 connect to the deflection electrodes of video coder 11. The cascade arrangement of blocking oscillator 25 and multivibrator 26 executes a series of fourteen operating steps in completing each cycle and realizes a total count-down ratio of 14:1. Thus, the control signal from multivibrator 26 exhibits a rectangular waveshape having amplitude changes every seven line traces. This effects actuation of video coder 11 between its two operating conditions and interposes the time-delay network in the video channel during alternate groups of seven successive line-trace intervals to introduce a time delay between the radiated video and synchronizing components. Since the waveform of the control signal from unit 26 determines when mode changes are made and also in what mode the system is established when a change is made, that waveform represents the code schedule or mode changing pattern of the system.

To reset blocking oscillator 25 to its reference or zero-count operating step, a feedback circuit, including a differentiating circuit 29, is provided from the output of multivibrator 26 to the reset input of the oscillator. The amplitude excursions of the output signal from multivibrator 26 determine when oscillator 25 is reset.

In order to interrupt the periodic, cyclic actuation of the counting chain 25, 26, random code signal generating apparatus, shown by a single block 32, is provided for developing, during a portion of each field-retrace interval, a combination or group of code signal components or bursts individually having a predetermined identifying characteristic, such as frequency, and collectively representing coding information in accordance with their appearance and order within the combination. Attention is directed to the copending Watters application, Serial No. 26,545, and references mentioned therein, for the details of the code signal generating apparatus included in unit 32. The code signal combination produced during each field-retrace interval may comprise a series of up to ten code signal bursts, each of which may have any one of fire different frequencies selected from a group of six frequencies designated $f_1$–$f_6$, and these bursts are preferably randomly sequenced and randomly appearing within the overall code burst interval. The sixth frequency of the group $f_1$–$f_6$, which is not used as a code signal frequency, is devoted to correlation testing purposes as will be explained. To provide the correlation signal components, a series of generators, schematically shown by a single block 34, has a series of six output terminals, labeled $f_1$–$f_6$, each of which delivers a continuous sinusoidal signal of an assigned, respective one of frequencies $f_1$–$f_6$. The $f_1$–$f_6$ output terminals of unit 34 are respectively connected to a series of six stationary switch contacts 41–46 of a simple six-position rotary switch 40. The rotary switch contact 47 of switch 40 is connected to the signal generating apparatus of unit 32.

With this arrangement, a single frequency selected from the group $f_1$–$f_6$ is employed for correlation testing purposes and it is contemplated that this correlation frequency may be changed from program to program. The frequencies of the group $f_1$–$f_6$, with the exclusion of the correlation frequency, are then employed for coding purposes. Suitable and simple adjustments of the apparatus of block 32 may be made by the operator of the subscription television transmitter in order that the frequency devoted to correlation testing for a given program is not used for coding. For example, in the illustrative setting of switch 40 in FIGURE 1, frequency $f_5$ has been selected for correlation testing. Accordingly, the code signal generating apparatus of block 32 will be adjusted by the operator so that only the five frequencies $f_1$–$f_4$ and $f_6$ are devoted to scrambling.

The output terminals of unit 32, which provide combinations of code and correlation signal components collectively exhibiting frequencies $f_1$–$f_6$, are connected to another input of mixer amplifier 13 by way of conductor 48 to facilitate their conveyance to subscriber receivers. The output terminals of unit 32 are also connected to a series of six filter and rectifier units, conveniently shown in FIGURE 1 by a single block 49, respectively selective to assigned ones of the different frequencies $f_1$–$f_6$ to facilitate separation of the code and correlation signal components from one another. The six outputs of the filter and rectifier units, each of which produces rectified pulses of one of frequencies $f_1$–$f_6$ as indicated in the drawing, are connected to a series of six input circuits or conductors 51–56, respectively, of an adjustable code-determining switching apparatus or permutation device 60 having a series of five output circuits or conductors 61–65. The input and output circuits of adjustable switching apparatus 60 may be considered code-determining circuits between which mechanism 60 establishes different prescribed ones of a multiplicity of different interconnection patterns. This may be achieved by a family of switches, the adjustment of which selects the desired permutation pattern between inputs and outputs for a given program interval. Preferably apparatus 60 takes the form of that which is described in detail in the concurrently filed Morris case. Suffice it to say at this point that apparatus 60 has a manual control knob and a display window behind which is a cyclometer register having three number wheels and one letter wheel. The permutation pattern between input conductors 51–56 and output conductors 61–65 may be changed simply by rotating the control knob. Indicia, in the form of a combination of three numbers and one letter, is displayed within the window and represents the permutation pattern which instantaneously exists between the input and output circuits of switching apparatus 60.

Adjustable switching apparatus 60 is provided to permute applied code signal components between its input and output circuits in order that the code bursts developed in unit 32 may be further coded before they are used for coding the video signal. It is contemplated that the switching arrangement will be adjusted differently for each program for which a charge is to be assessed and, if desirable, the arrangement of the code-determining apparatus installed at each receiver within a given service area will require a different setting for any selected program in order that each subscriber must obtain different switch setting data for each program.

Output circuits 61 and 65 of switching apparatus 60 are connected to ground or "thrown away." Apparatus 60 is so adjusted for any given program that the correlation frequency component is routed therethrough to output conductor 65 and thrown away. This is done because the correlation component is only required at the receiver, as will be explained, and is not needed in the operation of the transmitter.

The other three output conductors 62–64 of switching mechanism 60 are connected to respective ones of a series of three normally-closed or normally-blocked gate circuits 67–69 which are supplied with line-drive pulses from the synchronizing signal generator of unit 19. The output circuits of gates 67–69 are connected to input circuits 71–73, respectively, of bi-stable multivibrator 26. Input circuit 72 is preferably coupled to the common or counting input of multivibrator 26 so that each time a pulse is translated thereover, multivibrator 26 is triggered from its instantaneous condition, whichever one that may be, to its opposite condition in the same manner as if it had been supplied with a pulse from blocking oscillator 25. Input circuit 71 is preferably connected to one of the reset inputs of multivibrator 26 and in response to each pulse applied thereover establishes the multivibrator in a predetermined one of its operating conditions if it is not already there. Input 73, on the other hand, is preferably connected to the other reset input of the multivibrator in order to trigger the multivibrator to the other of its stable operating conditions, if it is not already in that other condition, in response to pulses applied over that input.

Circuitry identical to units 25–29 and 49–73 is found in the receiver of FIGURE 2 and in order to maintain precise synchronism of operation between such corresponding circuitry, it is essential that code-determining switching apparatus 60 at the receiver be positioned identically to the companion switching apparatus in the transmitter of FIGURE 1. To test for correlation, namely to effectively compare the switch setting pattern at the receiver with respect to that at the transmitter, it is necessary that the timing of the correlation signal components be tied in or related to the code schedule of the coded video signal, namely the schedule as represented by the amplitude excursions of the control signal developed in the output of multivibrator 26. As fully explained in the copending Watters case, Serial No. 26,545, the apparatus in unit 32 controls the timing or occurrence of the correlation signal components in order to facilitate correlation testing in the receiver. In order to correlate the timing of the correlation components with the code schedule, connections are required from the outputs of multivibrator 26 and blocking oscillator 25 to separate input circuits of the apparatus of unit 32. In addition, a connection is required from the sync generator of unit 19 to another input of unit 32 in order to supply field-drive pulses thereto. These three connections are all shown in FIGURE 1. With this arrangement and as will be explained, a single correlation signal component is produced and conveyed to subscriber receivers during each field-retrace interval. It is timed to occur during an interval in which multivibrator 26 is established in a predetermined one of its two conditions.

The audio signal portion of the telecast is provided by audio source 77 which may constitute a conventional microphone and audio amplifier. The output of audio source 77 is coupled through an audio coder 78 to the input of an audio carrier wave generator and modulator 79, the output circuit of which is coupled to another input of diplexer 16. Audio coder 78 may take any one of a multiplicity of different forms; the only requirement is that it successfully scramble the audio intelligence. Coder 78 may, for example, be simply a frequency shift type of coder in which heterodyning techniques are employed to shift the audio information, with an inverted frequency distribution, to a portion of the frequency spectrum where it does not normally reside. Preferably, the audio signal is shifted to a higher portion of the frequency spectrum. Such an audio scrambling function is adequate since it effectively codes a characteristic of the audio signal inasmuch as a normal television receiver would not contain suitable compensating circuitry for re-inverting and re-shifting the audio signal components frequency-wise.

Considering now the operation of the transmitter of FIGURE 1, picture converting device 10 develops a video signal representing the picture information to be televised and, after amplification in amplifier 12, the video signal is translated through video coder 11 to mixer amplifier 13 wherein it is combined with the customary field- and line-synchronizing and blanking pulses from the synchronizing signal generator of unit 19. Mixer 13 thereby develops a composite video signal which is applied through direct current inserter 14 to video carrier wave generator and modulator 15, wherein it is amplitude modulated on a picture carrier for application through diplexer 16 to antenna 17 from which it is radiated to subscriber receivers. The field- and line-sweep systems are synchronized by the field- and line-drive pulses from the sync generator of unit 19 in conventional manner.

Audio source 77 meanwhile picks up the sound information accompanying the telecast, amplifies and supplies it to audio coder 78 wherein the audio components are shifted in the frequency spectrum, with an inverter frequency distribution, to occupy abnormal positions to achieve sound scrambling. The coded audio signal is frequency modulated on a sound carrier in unit 79 and the modulated sound carrier is supplied through diplexer 16 to antenna 17 for concurrent radiation to subscriber receivers with the video information.

Coding of the video portion of the telecast is achieved by coder 11 under the influence of the deflection-control signal developed from line-drive pulses by blocking oscillator 25 and multivibrator 26 for periodically switching the beam of the beam-deflection tube in coder 11 back and forth between its two collector anodes in accordance with the code schedule represented by the amplitude variations of the control signal, which occur every seven line traces because of the total 14:1 count down ratio of counting stages 25, 26.

In order to interrupt this periodic mode-changing pattern and increase the complexity of the code schedule, a combination of up to ten code signal components, individually exhibiting one of five different frequencies selected from the group $f_1$–$f_6$ (the sixth frequency in the group being devoted to correlation testing), is developed in source 32 during each field-retrace interval. The code signal bursts are separated from one another and rectified in filter and rectifier units 49 for individual application to the various input circuits 56–56 of switching apparatus 60. This apparatus may establish any one of a multitude of circuit connections between its input and output conductors so that rectified pulses are supplied, via output circuits 62–64, to normally-closed gate circuits 67–69 with a distribution depending on the instantaneous setting of mechanism 60. Of course, if switching apparatus 60 connects one or more of input conductors 51–56 to output circuit 61, the code signal components translated thereover are channeled directly to ground or "thrown away." Grounding output 61 increases the total number of available permutations between the input and output circuits of switching apparatus 60. The components exhibiting the frequency devoted to correlation testing are channeled to output conductor 65 whch is connected to ground in order that such correlation signal components may be eliminated so far as video coding is concerned.

Gates 67–69 also receive line-drive pulses from the sync generator of unit 19 and gate in those of the line-drive pulses that occur in time coincidence with the rectified code signal components to input circuits 71–73 of multivibrator 26 to effect actuation thereof. Since the code signal components are preferably randomly sequenced, the cyclic actuation of the multivibrator, normally taking place in response to pulses from oscillator 25 only, is therefore interrupted. In order to add additional scrambling into the system, the control signal from multivibrator 26 is differentiated in differentiating circuit 29 and the differentiated pulses are fed back to oscillator 25 for resetting purposes. Because of the feedback arrangement, random actuation of control mechanism 26 results in random resetting of oscillator 25. Hence, upon the termination of each combination of code bursts, counting chain 25, 26 is established at a different one of its fourteen operating steps or phase conditions from that in which it would have been established if the periodic actuation had not been interrupted. The control signal developed in the output of multivibrator 26 therefore constitutes a rectangular shaped signal which is phase modulated during field-retrace intervals.

To very briefly summarize the operation of the transmitter of FIGURE 1, the code signal components developed in source 32 are permutably applied by way of adjustable switching apparatus 60 to a plurality of input circuits 71–73 of control mechanism 26 to develop a control signal having a code schedule (specifically wave shape) determined in part by the instantaneous setting of switching apparatus 60 and in part by the random characteristic of the code signal components.

In order that a subscriber may utilize the coded transmission, it is necessary that each combinaton of code signal components may be made known to the subscriber receivers. To that end, the code signal components are applied to mixer amplifier 13 over conductor 48 to be combined with the composite video signal for transmission to the subscriber receivers. To facilitate correlation testing at each receiver, the signal generating apparatus of unit 32 produces correlation signal components of the frequency determined by the setting of rotary switch 40 and having a timing which is correlated or tied in with the amplitude excursions of the output signal of bi-stable multivibrator 26. Specifically, a single correlation signal burst is produced during each field-retrace interval and is timed to occur when control mechanism 26 is established in a predetermned one of its two conditions. These correlation signal components are also transmitted to the subscriber receivers via connection 48.

The subscriber receiver of FIGURE 2 is constructed in accordance with one embodiment of the invention to decode especially the coded television signal developed in the transmitter of FIGURE 1. A cascade arrangement of a radio frequency amplifier, a first detector or oscillator-mixer, an intermediate frequency amplifier of one or more stages, and a second detector, all combined for convenience in FIGURE 2 in a single block or unit 90, has its input terminals connected to a receiving antenna 91 and its output terminals connected to a first video amplifier 92. The output of video amplifier 92 is coupled through a video decoder 95 to the input terminals of a second video amplifier 96 which in turn has output terminals connected to the input of an image-reproducing device or a picture tube 97. Decoding device 95 may be identical in construction to video coder 11 in the transmitter except that it is controlled to operate in complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 95 with no delay, whereas when no delay is introduced at the transmitter, a delay is imparted to the video signal in video decoder 95. First video amplifier 92 is also coupled to a synchronizing signal separator which is connected to the usual field-sweep system and line-sweep system connected in turn to the deflection elements (not shown) associated with picture tube 97. For convenience, the combination of the sync separator, and the field- and line-sweep systems have been shown by a single block 99.

Assuming that the illustrated receiver is of the intercarrier type, an intercarrier signal component is derived from first video amplifier 92 and is supplied to a unit 103 consisting of a conventional amplifier, amplitude limiter and discriminator detector. The output of unit 103 is coupled through a frequency shift audio decoder 104 to an audio amplifier and speaker, combined for illustrative purposes in a single unit 105. Audio decoder 104 may be similar to audio coder 78 in the transmitter except that it is effectively operated in complementary fashion in order to shift or return the scrambled audio information from the portion of the spectrum which it occupies, as transmitted, back to the original, appropriate location as required to accomplish audio unscrambling.

It is assumed that second video amplifier 96 and the audio amplifier portion of unit 105 each contain a vacuum tube. Filaments for those vacuum tubes, designated by the numerals 108, 109, are respectively shown in units 96, 105. The circuitry for applying heater voltage to those two filaments will be described hereinafter. Suffice it to say at this point that filaments 108 and 109 are not energized until after the correlation test procedure has been completed and it has been found that there is a correct condition of correlation between the setting of the code-determining switching apparatus at the receiver and that at the transmitter. With filaments 108 and 109 energized, intelligible reproduction of the video and audio signals is obtained.

To facilitate the separation of the code signal components from the composite television signal, a monostable multivibrator 112 is connected to the sync separator portion of unit 99 to receive field-drive pulses therefrom and the output of the mulivibrator is coupled to one input of a normally-blocked gate circuit 113, another input of which is coupled to the output of first video amplifier 92 to receive the coded composite video signal. The output of gate 113 is connected to a series of filter and rectifier units, once again illustrated for convenience as a single block 49. The output of gate 113 provides both the code and correlation signal components; thus all of the frequencies $f_1$–$f_6$ are delivered to unit 49.

The arrangement of elements 25–64 and 67–73 in FIGURE 2 is identical with the correspondingly numbered units in the transmitter of FIGURE 1. The only difference is that while blocking oscillator 25 in the transmitter receives line-drive pulses from the synchronizing signal generator, oscillator 25 in the receiver of FIGURE 2 receives line-drive pulses from the line-sweep system of unit 99.

In order to achieve a test of correlation in accordance with the teachings of the copending Watters case, Serial No. 26,545, output conductor 65 of code-determining switching apparatus 60 in the receiver of FIGURE 2, rather than being connected to ground as in the transmitter, is connected to one input of a normally-closed gate circuit 115, another input of which is connected to the line-sweep system of unit 99 to receive line-drive pulses therefrom. The output of gate 115 is connected to one input of a comparison device in the form of a normally-closed gate 116, another input of which is connected to the output of bi-stable multivibrator or control mechanism 26. If the adjustment of code-determining switching apparatus 60 in the receiver agrees with that of switching apparatus 60 in the transmitter, the relationship between the output signal of multivibrator 26 and the correlation components developed at output conductor 65 will be the same at both the transmitter and receiver. Specifically, the timing of the correlation signal components is arranged at the transmitter so that one such component occurs during each field-retrace interval and at a time when control mechanism 26 is established in a prescribed condition such that its output signal exhibits an amplitude level of a polarity and magnitude sufficient to open gate 116 to gate in the line-drive pulse, occurring in time coincidence with the correlation component, to the output of gate 116.

Since the wave shape of the output control signal of the multivibrator 26 is influenced by the instantaneous setting of the code-determining switching apparatus 60 in addition to the random nature of the code signal components applied over input circuits 71–73, the output signal may be considered a comparison signal having a characteristic determined, at least in part, by the instantaneous adjustment of the code-determining apparatus. Comparison device or gate 116 therefore constitutes means responsive to the comparison signal for effectively comparing the instantaneous adjustment of the code-determining apparatus with a given adjustment in accordance with which it should be adjusted to effect a series of correlation tests to determine if the code-determining apparatus has in fact been properly adjusted by the subscriber. The instants at which correlation tests are made are determined by the occurrence of the pulses at the output of gate 115. For a properly adjusted receiver, a pulse should be developed in the output of gate 116 during each field-retrace interval. When there is incorrect correlation, the waveform of the control signal from multivibrator 26 will not exhibit the required magnitude and polarity at the instants of the correlation components and pulses will not be developed in the output of gate 116 during each field-retrace interval.

The output terminals of gate 116 are connected to a correlator monostable or single trip multivibrator 120. The single output pulse developed by gate 116 during each field-retrace interval, when correct correlation prevails, actuates correlator multivibrator 120 from its normal to its abnormal operating condition, in which it remains for an interval slightly less than a complete field-trace interval. With this arrangement, correlator multivibrator 120 automatically falls back to its normal or reset condition at some instant preceding each correlation test. Unit 120 could also, of course, take the form of a blocking oscillator which would reset itself after an interval of a predetermined duration. One output terminal of correlator multivibrator 120 is connected to ground and the other is connected to one terminal of a correlator relay 122, the other terminal of the relay being coupled to ground through a condenser 123.

The connection of relay 122 to multivibrator 120 is arranged so that the relay energizes when the multivibrator is triggered to its abnormal condition. Although, in a properly correlated receiver, multivibrator 120 falls back to its normal condition for a relatively short time interval immediately preceding each correlation test, the construction of relay 122 and the capacitance of condenser 123 introduce a time constant such that the relay does not become de-energized during that short time interval. Alternatively, the relay may be made to have a certain degree of inertia so that once energized it does not become de-energized until multivibrator 120 falls back to its normal condition and remains there for an interval substantially greater than the short interval in a properly correlated receiver.

An A.C. voltage source 125 is provided for producing an A.C. voltage of a magnitude suitable for, inter alia, energizing filaments 108 and 109. For example, if the tubes of the second video amplifier and audio amplifier are of the type requiring 6.3 volts filament voltage, source 125 will be a 6.3 volt source. One output terminal of source 125 is connected to ground while the other is connected to a fixed contact 127 of a simple two-position switch 128. Fixed contact 129 of the switch is isolated and unconnected. Contacts 127 and 129 are labeled "P.V." and "T.V.," respectively. Switch 128, which is called the PV-TV switch, is to be positioned by the subscriber. When positioned to the TV position, all of the circuitry in FIGURE 2 associated with decoding or unscrambling is de-energized and the receiver functions in the conventional manner of any non-subscription receiver. On the other hand, when switch 128 is positioned to the PV position, circuitry (not shown) is completed to energize all of the decoding apparatus. The indicia "PV" is a shorthand designation of the assignee's "PHONEVISION" subscription television system.

Movable contact 130 of switch 128 is connected to one terminal of the field coil 133 of a timer motor assembly or timing mechanism 135, the other terminal of which is coupled through the coil 137 of a buzzer assembly 138 to ground. A correlator lamp 141 is coupled in shunt with field coil 133. Timing mechanism 135 has a series of five spring contacts 142–146 which are controlled by a rotatable cam member 148. Cam 148 is spring biased so that it normally assumes its starting or reference position illustrated in FIGURE 2. In that condition, all of contacts 142–146 are open, cam 148 holding contact 145 away from contact 146. When an alternating voltage of the appropriate magnitude is applied to field coil 133 to energize timing mechanism 135, cam 148 begins to rotate in a clockwise direction. After approximately 10° of travel, cam 148 releases contact 145 and it springs into electrical engagement with contact 146. Cam 148 continues to rotate until it reaches a final condition, approximately 90° from its starting point, at which cam 148 moves contacts 142, 143 and 144 together to establish an electrical connection therebetween. Of course, the time interval, which may be called the correlation testing interval or timing cycle, required for cam 148 to progress from its starting position shown in FIGURE 2 to its final position, 90° away, may be made as long or short as desired. It has been found that a period of ten seconds is adequate, contacts 145 and 146 closing within the first one-half second of the ten-second timing cycle. Timing mechanism 135 therefore tolls a ten-second time interval.

Correlator relay 122 controls a movable relay contact 151; when the relay is de-energized, contact 151 is spring biased to engage and make electrical contact with a fixed contact 152. On the other hand, when relay 122 is energized contact 151 is moved into engagement with contact 153. Movable contact 151 is connected to ground, contact 152 is connected to contact 146 of timing motor 135, and contact 153 is connected to the three-way junction 154 of field coil 133, buzzer coil 137 and correlator lamp 141.

Movable contact 130 of PV-TV switch 128 is also connected to the movable contact 158 of a two-position micro-switch 160 actuated by an access door (not shown) which is positioned by the subscriber between open and closed positions in a manner fully described in the concurrently filed Morris application. When the door is closed, contact 158 makes an electrical connection with a fixed contact 161 of door switch 160, and when open movable contact 158 establishes an electrical contact with fixed contact 162. Contact 162 is connected through a cyclometer pilot light 163 to ground, the pilot light serving to illuminate the cyclometer register. Fixed contact 161 is coupled through a normally-closed switch 165 having a movable contact 166 which normally engages a fixed contact 167. Switch 165 is opened by mechanical apparatus described in the concurrently filed Morris case.

Fixed contact 167 is connected through a print solenoid 170, connected in shunt with an erase head 171, to a terminal 172 which in turn is connected to one side of each of filaments 108 and 109. The other side of each of the filaments is connected to movable contact 130 of the PV-TV switch. Print solenoid 170 and erase head 171 are employed, as explained in detail in the Morris case, to record simultaneous charges for each program. Actually, two different charge registers are actuated for each program. A solenoid 174, coupled between terminal 172 and movable contact 130, serves to lock the access door which is positioned by the subscriber after certain conditions are met in the receiver, as also explained in the Morris application.

Contact 142 of timing mechanism 135 is connected to ground, and contact 144 is connected to terminal 172 via a fuse 176. Contact 143 of timer motor 135 is connected to one terminal of a condenser 178, the other terminal of which is connected to the junction of correlator relay 122 and condenser 123. Condenser 178 has a relatively large capacitance in order that the time constant of relay 122 and condenser 123 may be increased considerably by adding capacitor 178 thereto. As will be learned, increasing the time constant of relay 122 permits it to remain energized for a longer interval after correlator multivibrator 120 has returned to its normal condition. In fact, by making condenser 178 sufficiently large in capacitance, relay 122 will remain energized even though several field-trace intervals occur between successive output pulses from gate 116.

It will be recalled that the waveform of the output control signal of multivibrator 26 must exhibit a particular magnitude and polarity at the instant of each correlation pulse produced in the output of gate 115 in order that gate 116 may gate those correlation pulses into multivibrator 120. Since the magnitude and polarity of the output signal of multivibrator 26 is determined at any given instant by the condition in which the multivibrator finds itself at the time, multivibrator 26 must therefore be established in a given condition at the instant of each correlation pulse in order that gate 116 is turned on during the appropriate intervals.

In accordance with the present invention, contact 145 of timing mechanism 135 is connected to another input circuit 179 of multivibrator 26 in order to lock multivibrator 26, during certain intervals, in the particular one of its two stable operating conditions which results in the output signal of the multivibrator assuming a magnitude and polarity that will not turn gate 116 on. Specifically, and as will be described subsequently, when input circuit 179 is coupled to ground, multivibrator 26 is triggered to its operating condition in which it may be established during the occurrence of the correlation pulses when there is incorrect correlation. Since multivibrator 26 will remain in that condition while input circuit 179 is established at ground so that correlation pulses cannot be translated to correlator multivibrator 120, the circuit from contact 145 to input circuit 179 is appropriately called a "lock out" circuit as indicated in FIGURE 2. As will be explained, the lock out circuit is made effective in response to a single test failure during the testing interval in order to make certain that the timing mechanism is interrupted for a predetermined interval.

While, as mentioned before, switching apparatus 60 in the transmitter may include merely a family of suitable switches for interconnecting inputs 51–56 to outputs 61–65, apparatus 60 in the receiver should preferably take the form of that illustrated in detail in the concurrently filed Morris application, although this is certainly not essential.

Consideration will now be given to an explanation of the operation of the described receiver. It is contemplated that code-determining switching apparatus 60 will be adjusted differently for each different subscription program, and that the code or switch combination, namely the number-letter combination that should appear in the window in front of the cyclometer register (not shown), representing the adjustment of code-determining switching apparatus 60 for each program, will be widely publicized, such as in program booklets, newspaper listings, etc. Advance wide scale publicity will also be given relative to the nature and cost of each program. The subscriber must therefore initially ascertain the particular code combination for a specified program in which he is interested. Assuming that the main television off-on switch is turned on, the subscriber then opens the access door (not shown) to its open position. If the PV-TV switch has not already been placed in its PV position, the act of opening the access door will do so, as is fully explained in the concurrently filed Morris application.

Meanwhile, A.C. voltage from source 125 is applied to the parallel combination of correlator lamp 141 and field coil 133 which combination is in series with coil 137 of buzzer 138. Neither the field coil nor the correlator lamp will energize with buzzer coil 137 in series therewith, although the buzzer itself energizes. This provides an audible indication to the subscriber that the code-determining apparatus has not been positioned to the correct adjustment. In addition, door switch 160 is actuated by opening the access door so that movable contact 158 is brought into engagement with fixed contact 162 so that cyclometer pilot light 163 may be illuminated. This, of course, aids the subscriber in seeing the numbers and letters of cyclometer register, particularly when the decoding equipment is located in a semi-dark room. The subscriber now adjusts switching apparatus 60 until the appropriate number-letter combination is displayed within the window in front of the cyclometer register, in a manner clearly described in the Morris case.

Assume now that code-determining switching apparatus 60 in the receiver has been properly set up for the program in question and its setting agrees with the corresponding switching apparatus in the transmitter of FIGURE 1. Decoding of the received television signal may take place. Specifically, the coded television signal is intercepted by antenna 91, amplified in the radio frequency amplifier in unit 90 and heterodyned to the selected intermediate frequency of the receiver in the first detector. The intermediate frequency signal is amplified in the intermediate frequency amplifier and detected in the second detector in unit 90 to produce a coded composite video signal which is translated through the cascade arrangement of first video amplifier 92, video decoder 95 and the second video amplifier 96 to the input electrodes of cathode-ray image reproducer 97 to control the intensity of the cathode ray beam thereof in conventional manner. Of course, this occurs only after filament 108 of second video amplifier 96 has been energized in a manner to be described. Video unscrambling occurs in complementary fashion to the video coding function in the transmitter and the input electrodes of picture tube 97 are supplied with completely unscrambled video information. The sweep systems in unit 99 are controlled in conventional manner by the synchronizing signal separator.

The intercarrier sound signal is applied to unit 103 from the output of first video amplifier 92 wherein it is amplified, amplitude limited and demodulated to a scrambled audio signal which takes essentially the same form as that produced in the output of audio coder 78 in the transmitter. The scrambled audio signal is successfully unscrambled in audio decoder 104 by virtue of the fact that the components thereof are returned to their proper positions in the frequency spectrum, and the output of audio decoder 104 effectively constitutes a replica of the original uncoded sound signal. When filament 109 of the audio amplifier in unit 105 is energized, in a manner to be described, this replica is amplified and reproduced in the speaker of unit 105.

Monostable multivibrator 112 responds to field-drive pulses from unit 99 to produce gating pulses each having a duration sufficient to embrace the time interval in which the code and correlation signal components appear during each field-retrace interval, and those components are gated in by gate 113 for application to filter and rectifier units 49. Since code-determining switching apparatus 60 in the receiver is positioned in accordance with the same setting as the corresponding switching apparatus in the transmitter, units 25–73 operate in the same manner as described in connection with the identically numbered elements in the transmitter so that receiver decoding is in sychronism with transmitter coding. In this way, the rectangular shaped control signal developed in the output of multivibrator 26 and used for actuating video decoder 95 has a waveform identical to the waveform applied to video coder 11.

In order to perform a series of correlation tests to determine if the code-determining apparatus has, in fact, been properly positioned by the subscriber, a single correlation component of frequency $f_5$ occurs during each field-retrace interval and is channeled through apparatus 60 to gate 115 wherein it gates into normally-closed gate 116 the line-drive pulse occurring in coincidence therewith. As fully described in the copending Watters case Serial No. 26,545, when the receiver is appropriately adjusted the timing of the line-drive pulses selected by gate 115 are correlated with the output signal of multivibrator 26 such that the signal has a magnitude and polarity at the instants of the correlation pulses appropriate to turn gate 116 on and translate those line-drive pulses to correlator monostable multivibrator 120. Because of the normal cycling apparatus included in correlator monostable multivibrator 120, the multivibrator will always be established in its normal condition immediately prior to the arrival of the output pulses from gate 116. Consequently, each pulse from gate 116, and there will be only one per field-retrace interval, actuates correlator multivibrator 120 to its abnormal condition in which it remains until just prior to the next correlation test which occurs during the succeeding field-retrace interval.

Of course, if switching apparatus 60 is not adjusted in conformity to the adjustment at the transmitter, correlation pulses will not be translated through gate 116 to multivibrator 120 during each field-retrace interval, since multivibrator 26 has only a fifty-fifty chance of being in the appropriate condition at the occurrence of the correlation pulses. When properly correlated, however, multivibrator 120 is found in its abnormal condition, except for those brief intervals from the instants it returns to its normal condition to the succeeding correlation tests. As mentioned previously, correlator relay 122 remains continuously energized when the receiver is properly correlated.

In response to the initial energization of correlator relay 122, movable contact 151 actuates to establish an electrical connection with fixed contact 153 in order to apply ground to junction 154 of buzzer coil 137, correlator lamp 141 and field coil 133. The buzzer coil thus shorts out so that it no longer operates. Since buzzer coil 137 is no longer in series with the parallel combination of correlator lamp 141 and field coil 133, both of those elements are energized from source 125 via switch contacts 127 and 130 of PV-TV switch 128. Illumination of the correlator lamp provides a visual indication to the subscriber that his code-determining apparatus apparently has been properly set up.

Energization of field coil 133 initiates clockwise rotation of cam 148 of timing mechanism 135. As cam 148 leaves its starting position shown in FIGURE 2, contacts 145 and 146 immediately close. Preferably, these contacts should close within a half second of the initial rotation of cam 148. So long as correlator relay 122 remains energized during the progression of cam 148 during the testing interval, the closing of contacts 145 and 146 has no effect. However, it is desirable that any failure of a correlation test during the ten-second testing interval causes the return of timing mechanism 135 to its starting condition shown in FIGURE 2. The closing of contacts 145 and 146 for the lockout circuit, in accordance with the invention, insures that this will happen.

To elucidate, a mechanically driven timing mechanism, such as shown in the illustrated embodiment, usually requires an absence of energization for a minimum duration in order for the spring bias to fully return the mechanism to its starting condition. If it happens that code-determining switching apparatus 60 is incorrectly positioned but yet is so adjusted that most but not all of the input and output circuits are properly permuted, most of the correlation tests during a ten-second interval may prove successful, even though exact correlation does not prevail. In that event, the first failure during the test interval results in the absence of a pulse during a field-retrace interval at the output of gate 116, causing correlator monostable multivibrator 120 to fall back to its normal condition for at least the succeeding field-trace interval. Correlator relay 122 therefore de-energizes and movable contact 151 falls back to contact 152, removing ground from junction 154 and placing it on contacts 145 and 146. Buzzer 138 therefore energizes again, and correlator lamp 141 extinguishes, to provide the subscriber with an indication that correlation has been lost. Ground is now placed on input circuit 179 of bi-stable multivibrator 26 to actuate that multivibrator to its condition indicating incorrect correlation. In other words, an operating condition is imposed on the code-determining apparatus simulating miscorrelation. In this way, so long as ground is maintained on input 179, the output signal from multivibrator 26 can never assume the appropriate magnitude and polarity to gate a correlation pulse through gate 116 to multivibrator 120. As a consequence, correlator relay 122 will not again energize. The spring bias on timing mechanism 135 is thus permitted to return the mechanism all the way to its starting condition. This lockout arrangement consequently insures that any interruption of the energization of timing motor 135 during the ten-second timing cycle endures for at least the minimum duration required for the timing mechanism to return to its starting condition.

In the absence of this feature, it is possible that occasional correlation test failures would only result in arresting the progress of cam 148 or, alternatively, result in slipping back of cam 148 such that eventually the cam rotates or progresses to its final condition. Thus, it would be possible by an accumulation process, occurring during an interval longer than ten-seconds, for timer 135 to reach its final condition. It is desired that the operations that take place after timing mechanism 135 reaches its final condition should not occur in a receiver which is not properly adjusted.

The spring bias included in timing mechanism 135 consequently constitutes a reset device tending to restore the mechanism to zero time register and requiring a predetermined restoring time to effect such restoration. Multivibrator 120, correlator relay 122 and contacts 151 and 152 may be thought of as means for interrupting timing mechanism 135 in response to the failure of a correlation test during the predetermined time interval tolled by the mechanism. The lockout circuit to input 179 of multivibrator 26 constitutes means, responsive to the interrupting means, for extending the interruption of the timing mechanism for an interval corresponding to the predetermined restoring time.

Once again assuming that switching apparatus 60 is properly correlated with the adjustment of apparatus 60 in the transmitter, correlator relay 122 remains energized throughout the entire ten-second testing interval and in that period cam 148 progresses all the way to its final condition at which instant contacts 142, 143 and 144 are all brought together. At this time, ground on contact 142 is extended to terminal 172 to electrically connect each of print solenoid 170, erase head 171 and door lock solenoid 174 across the output terminals of A.C. voltage source 125. The high potential side of source 125 is connected to one side of door lock solenoid 174 merely by way of switch contacts 127 and 130 of PV-TV switch 128, whereas the high potential terminal is connected to one side of erase head 171 and print solenoid 170 via those same contacts of the PV-TV switch and also contacts 158 and 161 of door switch 160 and contacts 166 and 167 of switch 165.

The operation of print solenoid 170 and erase head 171 effect charge recording in a manner fully explained in the concurrently filed Morris application. Operation of door lock solenoid 174 locks the access door (not shown) as also described in Morris.

The establishment of terminal 172 at ground at the termination of the ten-second testing interval in a properly correlated receiver also results in energization of filaments 108 and 109 of the vacuum tubes of the second video amplifier 96 and the audio amplifier portion of unit 105, respectively. Of course, the second video amplifier and the audio amplifier may be combined in a single twin tube, in which case only a single filament need be energized. In any event, when filaments 108 and 109 heat up in response to the potential from source 125, the decoded video signal is extended to picture tube 97 while the unscrambled audio signal is extended to the speaker of unit 105. Thus, both the video and audio signals are intelligibly reproduced. Filaments 108 and 109 may therefore be considered means operable when timing mechanism 135 reaches its final condition for intelligibly reproducing the intelligence signal, namely either the audio or video signal. Terminal 172 and the circuitry connected thereto may be thought of as means, operable when timing mechanism 135 reaches its final condition, for producing a control effect indicating a correct correlation status between a given adjustment of apparatus 60 and its instantaneous adjustment.

It will be recalled that a special provision is made, in accordance with the present invention, to insure that timing mechanism 135 returns to its starting condition if there is only a single correlation test failure during the ten-second testing interval to make certain that code-determining switching apparatus 60 is correctly adjusted to the prescribed setting for the program under consideration before charges are recorded and the video and audio signals are extended to the picture tube and speaker respectively. Of course, momentary interruptions of the code and correlation signal components as a result of transmitter error, impulse noise, air plane flutter, etc., occurring during the ten-second test interval also result in the de-energization of the correlator relay 122 with the consequent return of timing mechanism 135 to its starting condition even though switching apparatus 60 may be correctly positioned. Under such circumstances, the completion of the correlation testing procedure will be delayed slightly. For example, if air plane flutter results in de-energization of correlator relay 122 after only eight seconds of the testing interval, timing mechanism 135 returns to its starting condition so that another ten seconds is required before it may reach its final condition. Thus, eighteen seconds would be required to effectively perform a sufficient number of correlation tests to make a determination that the code-determining apparatus is correctly adjusted.

While such a loss of correlation is not objectionable during the correlating testing interval, it is desirable that any such loss should be avoided after the testing period has been completed, and the audio and video channels have been effectively rendered operable. Otherwise, video and sound may be momentarily lost with each correlation loss which, of course, is most undesirable. Accordingly, when timing mechanism 135 is established in its final condition, ground from contact 142 is extended to the lower terminal of condenser 178, which has a relatively large capacitance, so that it is in shunt with condenser 123. In this way, the time constant of correlator relay 122 is increased considerably in order that the relay may remain or be held in its energized condition even though correlator multivibrator 120 falls back to its normal condition and remains there for several field-trace intervals.

In the event that switch contacts 166 and 167 do not open, for some reason or other, in response to the initial energization of solenoid 170, the current flowing through the solenoid also flows through slow-blow fuse 176, blowing the fuse after a predetermined delay interval, say several seconds. Since the fuse is in series with the energizing circuits for filaments 108 and 109, those filaments will now de-energize causing the video and audio channels to be inoperative. In the absence of this expedient, there is a remote possibility that the charge registers will not be actuated for each program to which the subscriber subscribes and thus there will be an inaccurate record of usage. By effectively rendering the equipment inoperative by blowing of fuse 176, the subscriber is required to call the subscription service operator in order that the malfunction may be remedied.

Of course, at the end of each subscription television program the receiver no longer receives the code and correlation signal components so that multivibrator 120 falls back to its normal condition wherein it will remain. The consequent de-energization of relay 122 results in the removal of ground from terminal 154 causing the timing mechanism to return to its starting condition. Buzzer 138 now operates indicating to the subscriber that he should turn his PV-TV switch 128 to the TV position. By so doing, all of the decoding circuitry is turned off and the receiver is converted to one of conventional non-subscription variety.

To summarize the invention to which the present application is directed, a communication receiver, specifically a subscription television receiver, is provided for utilizing a received intelligence (for example video) signal. Switching apparatus 60 constitutes an adjustable code-determining apparatus to be established in a predetermined condition of adjustment to effect utilization of the intelligence signal. Gates 115, 116, and their associated actuating circuitry provide testing means for performing a series of correlation tests to derive, in each of the tests, a control effect (namely, a pulse at the output of gate 116) if the instantaneous condition of apparatus 60 corresponds to the predetermined condition of adjustment. Timing mechanism 135 tolls a predetermined time interval, ten seconds in duration. The mechanism includes a reset device, namely a spring bias, tending to restore the mechanism to zero time register, namely its starting condition. A predetermined restoring time is required to effect such restoration. The lock-out circuit comprising contacts 145, 146 and 152 provide means, responsive to the failure of a correlation test during the predetermined testing interval, for interrupting the timing mechanism for an interval corresponding to the predetermined restoring time.

Of course, while the communication receiver of the invention has been shown in the environment of a subscription television receiver of the type wherein the received intelligence signal is coded or scrambled, the invention is certainly not so restricted. It is not necessary that decoding apparatus be provided nor a coded intelligence signal be present. For example, the invention may be applied to a communication receiver wherein the television signal is conveyed in conventional, uncoded form via a coaxial cable or other closed circuit. A simple gate circuit, blocking device, or disabling means of any kind may be interposed in the receiver prior to the picture tube and/or speaker in order to prevent intelligible reproduction until the code-determining apparatus has been properly set up.

Certain features described in the present application are disclosed and claimed in copending application Serial No. 117,431, filed June 15, 1961, in the name of Melvin C. Hendrickson et al., and also in the following copending applications filed concurrently herewith: Serial Nos. 169,766 in the name of George V. Morris et al.; 169,812 in the name of George V. Morris; and 169,762 in the name of Louis Terek, all of which are assigned to the present assignee.

While particular embodiments of the invention have been shown and described, modifications may be made and it is intended in the appended claims to cover all such modifications as may fall within the true spirit and scope of the invention.

We claim:

1. A communication receiver for utilizing a received intelligence signal comprising:
  an adjustable code-determining apparatus to be established in a predetermined condition of adjustment to effect utilization of said intelligence signal;
  testing means for performing a series of correlation tests to derive, in each of said tests, a control effect if the instantaneous condition of said apparatus corresponds to said predetermined condition of adjustment;
  a timing mechanism for tolling a predetermined time interval including a reset device for restoring said mechanism to zero time register and requiring a predetermined restoring time to effect such restoration;
  and means, responsive to the failure of a correlation test during said predetermined time interval, for interrupting said timing mechanism for an interval corresponding to said predetermined restoring time.

2. A communication receiver for utilizing a received intelligence signal comprising:
  an adjustable code-determining apparatus to be established in a predetermined condition of adjustment to effect utilization of said intelligence signal;
  testing means for performing a series of correlation tests to derive, in each of said tests, a control effect if the instantaneous condition of said apparatus corresponds to said predetermined condition of adjustment;
  a timing mechanism for tolling a predetermined time interval including a reset device tending to restore said mechanism to zero time register and requiring a predetermined restoring time to effect such restoration;
  means for interrupting said timing mechanism in response to the failure of a correlation test during said predetermined time interval;
  and means, responsive to said interrupting means, for extending the interruption of said timing mechanism for an interval corresponding to said predetermined restoring time.

3. A communication receiver for utilizing a received intelligence signal comprising:
  an adjustable code-determining apparatus to be established in a predetermined condition of adjustment to effect utilization of said intelligence signal;
  testing means for performing a series of correlation tests to derive, in each of said tests, a control effect if the instantaneous condition of said apparatus corresponds to said predetermined condition of adjustment;
  a timing mechanism for tolling a predetermined time interval including a reset device for restoring said mechanism to zero time register and requiring a predetermined restoring time to effect such restoration;
  and means, responsive to a negative test result during said predetermined time interval, for interrupting said timing mechanism and imposing on said code-determining apparatus an operating condition simulating miscorrelation for an interval corresponding to said predetermined restoring time.

4. A communication receiver for utilizing a received intelligence signal comprising:
  an adjustable code-determining apparatus to be established in a predetermined condition of adjustment to effect utilization of said intelligence signal;
  testing means for performing a series of correlation tests to derive, in each of said tests, a control effect if the instantaneous condition of said apparatus corresponds to said predetermined condition of adjustment;
  a timing mechanism responsive to the derivation of said control effect in each test of said series for tolling said predetermined time interval;
  a reset device included in said timing mechanism for restoring said mechanism to zero time register and requiring a predetermined restoring time to effect such restoration;
  means for interrupting said timing mechanism in response to the failure of a correlation test during said predetermined time interval;
  and means, responsive to said interrupting means, for extending the interruption of said timing mechanism for an interval corresponding to said predetermined restoring time.

5. A communication receiver for utilizing a received intelligence signal comprising:
  an adjustable code-determining apparatus to be established in a predetermined condition of adjustment to effect utilization of said intelligence signal;
  testing means for performing a series of correlation tests to derive, in each of said tests, a control effect if the instantaneous condition of said apparatus corresponds to said predetermined condition of adjustment;
  a timing device, responsive to said control effect, for tolling a predetermined time interval including a spring bias tending to restore said mechanism to zero time register and requiring a predetermined restoring time to effect such restoration;
  and means, responsive to the failure of a correlation test during said predetermined time interval, for interrupting said timing mechanism for an interval corresponding to said predetermined restoring time.

6. A communication receiver for utilizing a received intelligence signal comprising:
  code-determining apparatus, including a control mechanism actuated from one to another of a plurality of conditions, which must be adjusted in accordance with a given adjustment before said intelligence signal may be intelligibly reproduced;
  means for deriving a comparison signal from said control mechanism having a waveform determined, at least in part, by the instantaneous adjustment of said code-determining apparatus;
  testing means responsive to said comparison signal for effectively comparing the instantaneous adjustment of said code-determining apparatus with said given adjustment to effect a series of correlation tests to determine if said code-determining apparatus has in fact been properly positioned to said given adjustment;
  a timing mechanism for tolling a predetermined time interval including a reset device tending to restore said mechanism to zero time register and requiring a predetermined restoring time to effect such restoration;
  means for interrupting said timing mechanism in response to the failure of a correlation test during said predetermined time interval;
  and means, responsive to said interrupting means, for maintaining said control mechanism in a predetermined condition, such that said comparison signal exhibits a waveform indicating incorrect correlation, for an interval corresponding to said predetermined restoring time.

7. A communication receiver for utilizing a received intelligence signal comprising:
  an adjustable code-determining apparatus to be established in a predetermined condition of adjustment to effect utilization of said intelligence signal;

testing means for performing a series of correlation tests to derive, in each of said tests, a control effect if the instantaneous condition of said apparatus corresponds to said predetermined condition of adjustment;

a timing mechanism progressing, when energized, from a starting condition to a final condition during a predetermined time interval;

means for restoring said timing mechanism to its starting condition in response to the interruption of energization for at least a given minimum time duration;

means coupled to said testing means and responsive to the derivation of said control effect in each test during said predetermined time interval for energizing said timing mechanism during said time interval to permit said mechanism to attain its final condition;

means for interrupting the energization of said timing mechanism in response to the failure of a correlation test during said predetermined time interval;

and means, responsive to said interrupting means, for extending the interruption of said timing mechanism for an interval corresponding to said given minimum time duration in order that said timing mechanism returns to its starting condition.

No references cited.